(12) United States Patent
Corroy et al.

(10) Patent No.: US 11,197,195 B2
(45) Date of Patent: Dec. 7, 2021

(54) LOAD BALANCING OF DATA TRAFFIC IN A COMMUNICATIONS NETWORK

(71) Applicant: Telefonaktiebolaget LM Ericsson (publ), Stockholm (SE)

(72) Inventors: Steven Corroy, Järfälla (SE); Jing Fu, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/761,452

(22) PCT Filed: Oct. 12, 2015

(86) PCT No.: PCT/SE2015/051078
§ 371 (c)(1),
(2) Date: Mar. 20, 2018

(87) PCT Pub. No.: WO2017/065651
PCT Pub. Date: Apr. 20, 2017

(65) Prior Publication Data
US 2019/0059021 A1    Feb. 21, 2019

(51) Int. Cl.
*H04W 28/08* (2009.01)
*H04W 36/22* (2009.01)
*H04W 72/12* (2009.01)

(52) U.S. Cl.
CPC .......... *H04W 28/08* (2013.01); *H04W 36/22* (2013.01); *H04W 72/12* (2013.01)

(58) Field of Classification Search
CPC ...... H04W 28/08; H04W 72/12; H04W 36/22
See application file for complete search history.

(56) References Cited

U.S. PATENT DOCUMENTS

| 9,055,501 B2 | 6/2015 | Ekemark |
| 2006/0064497 A1* | 3/2006 | Bejerano ............... H04W 48/20 709/228 |

(Continued)

FOREIGN PATENT DOCUMENTS

| CN | 102164373 A | 8/2011 |
| CN | 102638872 A | 8/2012 |

(Continued)

OTHER PUBLICATIONS

F. Bénézit, S. Elayoubi, R. Indre and A. Simonian, "Modelling load balancing and Carrier Aggregation in mobile networks," 2014 12th International Symposium on Modeling and Optimization in Mobile, Ad Hoc, and Wireless Networks (WiOpt), Hammamet, 2014, pp. 78-85, doi: 10.1109/WIOPT.2014.6850282. (Year: 2014).*

(Continued)

*Primary Examiner* — Thinh D Tran
(74) *Attorney, Agent, or Firm* — Sage Patent Group

(57) ABSTRACT

There is provided mechanisms for load balancing data traffic between at least two carriers in a communications network supporting the at least two carriers. A method is performed by a system. The method comprises obtaining current channel quality information for a wireless device of the at least two carriers. The method comprises predicting a future volume of a data flow of the wireless device. The method comprises determining whether to offload the wireless device to a second carrier of the at least two carriers or not according to the current channel quality information and the predicted future volume.

19 Claims, 4 Drawing Sheets

(56) References Cited

U.S. PATENT DOCUMENTS

| | | | |
|---|---|---|---|
| 2009/0207740 A1* | 8/2009 | Crotti | H04L 43/026 370/241 |
| 2012/0039175 A1* | 2/2012 | Sridhar | H04W 28/08 370/236 |
| 2012/0236712 A1 | 9/2012 | Park et al. | |
| 2013/0040683 A1 | 2/2013 | Siomina et al. | |
| 2013/0194941 A1* | 8/2013 | Lu | H04W 52/0254 370/252 |
| 2014/0025022 A1 | 1/2014 | Cadden et al. | |
| 2014/0029425 A1* | 1/2014 | Rege | H04L 5/006 370/235 |
| 2014/0269300 A1* | 9/2014 | Bennis | H04W 28/08 370/235 |
| 2016/0150545 A1* | 5/2016 | Tayloe | H04L 1/0004 370/329 |
| 2016/0192258 A1* | 6/2016 | Ciullo | H04W 52/0258 370/331 |
| 2016/0219477 A1* | 7/2016 | Bergstrom | H04W 36/14 |
| 2016/0323789 A1* | 11/2016 | Narayanan | H04W 48/18 |
| 2016/0337929 A1* | 11/2016 | Koskinen | H04W 36/24 |
| 2017/0094675 A1* | 3/2017 | Salem | H04W 72/085 |
| 2017/0332422 A1* | 11/2017 | Ohta | H04W 76/11 |

FOREIGN PATENT DOCUMENTS

| | | | | |
|---|---|---|---|---|
| CN | 102958123 A | 3/2013 | | |
| WO | WO 2015/057120 A1 | 4/2015 | | |
| WO | WO-2015057120 A1 * | 4/2015 | ............ | H04W 28/08 |

OTHER PUBLICATIONS

Extended European Search Report for European Patent Application No. 15906319.7 dated Sep. 4, 2018, 5 pages.
Ericsson et al., "Detection of Small Cells in Hetnets," 3GPP TSG-RAN WG2 meeting #77, R2-120467, Dresden, Germany, Jan. 31, 2012, 3 pages.
International Search Report and Written Opinion of the International Searching Authority for International Application No. PCT/SE2015/051078 dated Jun. 17, 2016, 17 pages.
Hongseok Kim et al., "alpha-Optimal User Association and Cell Load Balancing in Wireless Networks," IEEE InfoCom, 2010 Proceedings, Published Mar. 14, 2010, 5 pages.
Andreas Lobinger et al., "Load Balancing in Downlink LTE Self-Optimizing Networks," 2010 IEEE Vehicular Technology Conference (VTC 2010—Spring), Taipei Taiwan, Published May 16, 2010, 5 pages.
3GPP TS 36.331 V12.7.0, "3$^{rd}$ Generation Partnership Project; Technical Specification Group Radio Access Network; Evolved Universal Terrestrial Radio Access (E-UTRA); Radio Resource Control (RRC); Protocol specification (Release 12)," Sep. 2015, 453 pages.
Search Report and Office Action dated Aug. 4, 2020 for Chinese Patent Application No. 2015800838238, 12 pages.

* cited by examiner

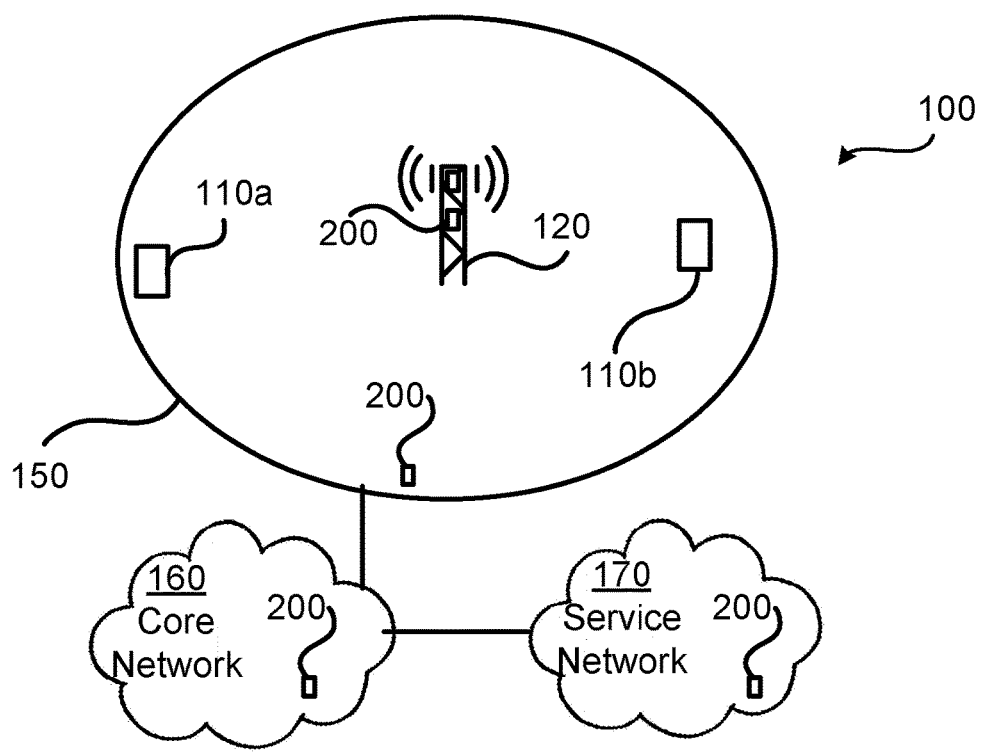
Fig. 1
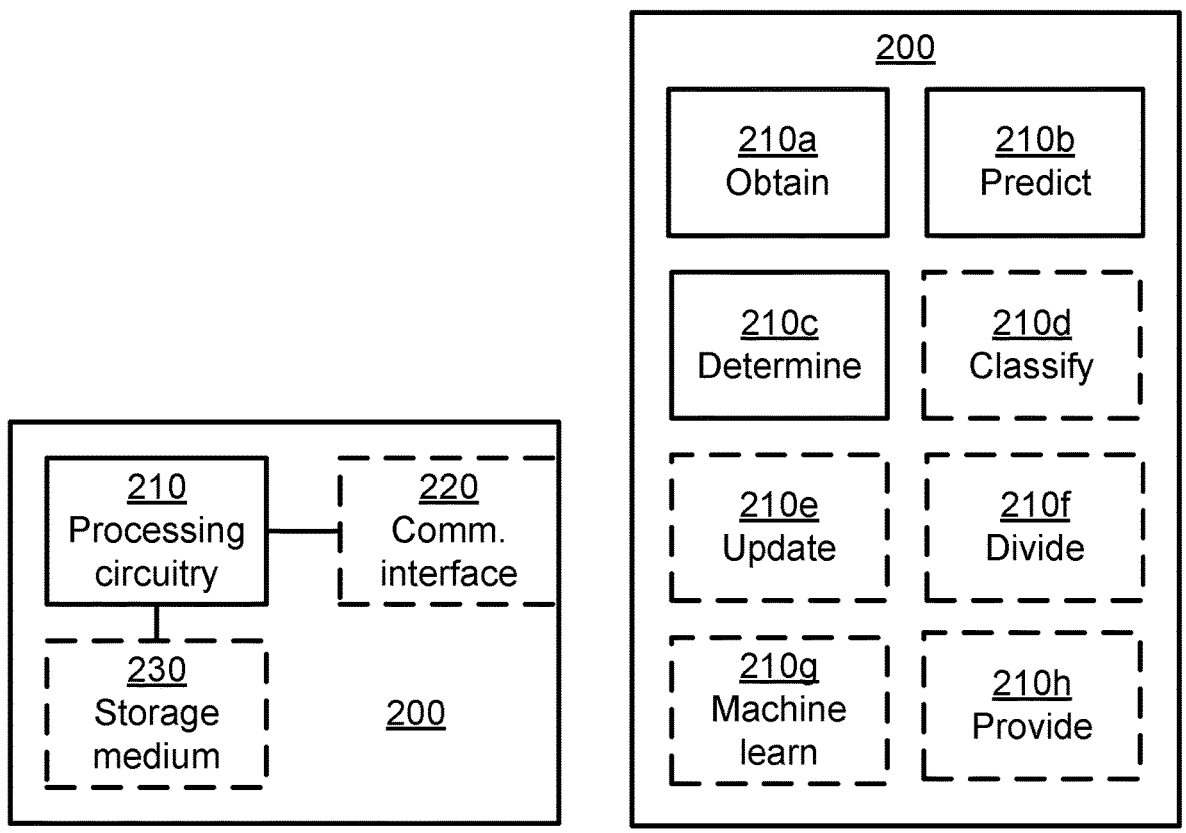
Fig. 2a
Fig. 2b

LOAD BALANCING OF DATA TRAFFIC IN A COMMUNICATIONS NETWORK

CROSS REFERENCE TO RELATED APPLICATION

This application is a 35 U.S.C. § 371 national stage application of PCT International Application No. PCT/SE2015/051078, filed on Oct. 12, 2015, the disclosure and content of which is incorporated by reference herein in its entirety.

TECHNICAL FIELD

Embodiments presented herein relate to a method, a system, a computer program, and a computer program product for load balancing data traffic between at least two carriers in a communications network supporting the least two carriers.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is the ability to perform load balancing.

Some communications networks support the use of at least two carriers. Each carrier has its own carrier frequency. US-9055501-B2 discloses such an example of communications networks. Another related document is 3GPP TS 36.331 V12.7.0 which exemplifies how channel quality information for the carriers can be defined.

In general terms, inter-frequency load balancing may be defined as moving the operative connection between a wireless device and a radio access network node, such as a radio base station, from one carrier frequency to another carrier frequency. The operative connection is thereby moved from a first carrier to a second carrier so as to enable both carriers to be similarly loaded (assuming that the carrier being offloaded, i.e., the first carrier, has a higher load than the carrier to which the operative connection is moved, i.e., the second carrier at the time of load balancing).

Two exemplary procedures to perform load balancing will be briefly summarized next.

According to a first approach, if the first carrier is overloaded then each new wireless device that establishes and operative connection to first primary carrier is automatically moved to the second carrier. One goal here is to have the same number of wireless devices on both carriers.

According to a second approach, if the first carrier is overloaded then a number of wireless devices that are served by the first carrier and out of those wireless devices served by the first carrier that have the best channel quality on the second carrier are moved to the second carrier. One goal is to have the same number of wireless devices on each carrier, but in contrast to the first approach, this second approach considers which wireless devices to be moved to the second carrier also in terms of channel quality.

Wireless devices having comparatively small shares of data to send and/or receive (in comparison to other wireless devices) contribute only to a small degree to the total load of a carrier whilst with wireless devices with larger shares of data to send and/or receive contribute much more to the total load of a carrier. By handing over wireless devices to another carrier, such as a second carrier, only based on the number of wireless devices on each carrier and the channel qualities of these wireless devices, the resulting total loads on each carrier may not be well balanced. For example, assume that a particular wireless device having comparatively small shares of data to send and/or receive is handed over to the second carrier, this particular wireless device will as soon as this comparatively small shares of data has been sent and/or received detach from its carrier and the imbalance of load between the carriers remains, thus triggering a new load balancing procedure to be carried out.

Hence, there is still a need for an improved load balancing procedure.

SUMMARY

An object of embodiments herein is to provide an efficient load balancing procedure such that the resulting total load is more well balanced between the carriers.

According to a first aspect there is presented system for load balancing data traffic between at least two carriers in a communications network supporting the at least two carriers. The system comprises processing circuitry. The processing circuitry is configured to cause the system to obtain current channel quality information for a wireless device of the at least two carriers. The processing circuitry is configured to cause the system to predict a future volume of a data flow of the wireless device. The processing circuitry is configured to cause the system to determine whether to offload the wireless device to a second carrier of the at least two carriers or not according to the current channel quality information and the predicted future volume.

Advantageously the disclosed system for load balancing provides efficient load balancing in a communications network supporting at least two carriers.

Advantageously the disclosed system for load balancing enables the resulting total load to be well balanced between the at least two carriers.

Advantageously the disclosed system for load balancing enables the offload determination to consider the future volume of the data flow of the wireless device.

According to an embodiment, predicting the future volume involves the processing circuitry to be configured to cause the system to:
classify the data flow of the wireless device into one of at least two data flow classes.

According to an embodiment each data flow class has a different data flow volume interval.

According to an embodiment each data flow volume interval is fixed.

According to an embodiment the processing circuitry is configured to cause the system to:
perform machine learning on a set of traffic flow properties and values thereof for a plurality of wireless devices and associated observed data flows of the wireless devices in order to determine the at least two data flow classes.

According to an embodiment, whether to offload the wireless device to the second carrier or not is determined also according to the data flow class in which the data flow has been classified.

According to an embodiment, values of properties for the data flow is associated with one of the at least two data flow classes, and wherein the data flow of the wireless device is classified into one of at least two data flow classes according to the values of properties.

According to an embodiment the properties comprise any of number of packets in the data flow, total size of all packets in the data flow, packet inter-arrival time for packets in the data flow, time since last packet for packets in the data flow, and packet bearer information of packets in the data flow.

According to an embodiment the processing circuitry is configured to cause the system to:
update the data flow class in accordance with which data flow class the data flow is classified into.

According to an embodiment the data flow initially is classified into at least two of the at least two data flow classes according to a probability measure, and wherein the most probable one of these at least two of the at least two data flow classes is selected as final classification of the data flow.

According to an embodiment the processing circuitry is configured to cause the system to:
divide the wireless devices in each data flow class between the at least two carriers according to the current channel quality information for the wireless devices.

According to an embodiment the wireless devices in each data flow class are divided as equally as possible between the at least two carriers.

According to an embodiment, wherein a case the wireless devices in one of the data flow classes are not exactly equally divided between the at least two carriers, the wireless devices in another one of the data flow classes are divided between the at least two carriers so as to equalize number of wireless devices between the at least two carriers.

According to an embodiment, which wireless devices in each data flow class to be offloaded to which one of the at least two carriers is determined according to the current channel quality information for the wireless devices.

According to an embodiment, which wireless devices in each data flow class to be offloaded to which one of the at least two carriers is further determined according to a difference between a values of the channel quality information for the wireless device on one of the at least two carriers and another one of the at least two carriers.

According to an embodiment the current channel quality information for a first carrier of the at least two carriers is defined by reference signal received power measurements on the first carrier.

According to an embodiment, where there are at least two second carriers of the at least two carriers, and wherein the current channel quality information for the at least two second carriers is defined by inter-frequency measurements.

According to an embodiment the inter-frequency measurements are defined by reference signal received power measurements on the at least two second carriers of the at least two carriers.

According to an embodiment the data flow comprises a sequence of packets scheduled either to or from the wireless device.

According to an embodiment all packets in the sequence of packets have an inter-arrival time as in accordance with a radio resource control inactivity timer.

According to an embodiment the processing circuitry is configured to cause the system to:
obtain an indication of traffic overload on at least one of the at least two carriers; and
wherein the indication acts as trigger for obtaining the current channel quality information, for predicting the future volume, and/or for determining whether to offload the wireless device or not.

According to an embodiment the processing circuitry is configured to cause the system to:
provide a load balancing command corresponding to a result from determining whether to offload the wireless device to the second carrier of the at least two carriers or not.

According to a second aspect there is presented a system for load balancing data traffic between at least two carriers in a communications network supporting the at least two carriers. The system comprises processing circuitry. The system comprises a computer program product. The computer program product stores instructions that, when executed by the processing circuitry, causes the system to perform a method according to the first aspect.

According to a third aspect there is presented a system for load balancing data traffic between at least two carriers in a communications network supporting the at least two carriers. The system comprises an obtain module configured to obtain current channel quality information for a wireless device of the at least two carriers. The system comprises a predict module configured to predict a future volume of a data flow of the wireless device. The system comprises a determine module configured to determine whether to offload the wireless device to a second carrier of the at least two carriers or not according to the current channel quality information and the predicted future volume.

According to a fourth aspect there is presented a radio access network node comprising a system according to any of the first, second, or third aspects.

According to a fifth aspect there is presented a method for load balancing data traffic between at least two carriers in a communications network supporting the at least two carriers. The method is performed by a system. The method comprises obtaining current channel quality information for a wireless device of the at least two carriers. The method comprises predicting a future volume of a data flow of the wireless device. The method comprises determining whether to offload the wireless device to a second carrier of the at least two carriers or not according to the current channel quality information and the predicted future volume.

According to a sixth aspect there is presented a computer program for load balancing data traffic between at least two carriers in a communications network supporting the at least two carriers. The computer program comprises computer code. The computer code, when run on processing circuitry of a system, causes the system to obtain current channel quality information for a wireless device of the at least two carriers. The computer code, when run on processing circuitry of a system, causes the system to predict a future volume of a data flow of the wireless device. The computer code, when run on processing circuitry of a system, causes the system to determine whether to offload the wireless device to a second carrier of the at least two carriers or not according to the current channel quality information and the predicted future volume.

According to a seventh aspect there is presented a computer program product for load balancing data traffic between at least two carriers in a communications network supporting the at least two carriers. The computer program product comprises a computer program and a computer readable storage medium on which the computer program is stored. The computer program comprises computer code which, when run on processing circuitry of a system, causes the system to perform a method according to the fifth aspect.

It is to be noted that any feature of the first, second, third, fourth, fifth, sixth, and seventh aspects may be applied to any other aspect, wherever appropriate. Likewise, any advantage of the first aspect may equally apply to the second, third, fourth, fifth, sixth, and/or seventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIG. 1 is a schematic diagram illustrating a communications network according to embodiments;

FIG. 2a is a schematic diagram showing functional units of a system according to an embodiment;

FIG. 2b is a schematic diagram showing functional modules of a system according to an embodiment;

DETAILED DESCRIPTION

Figure 2C:
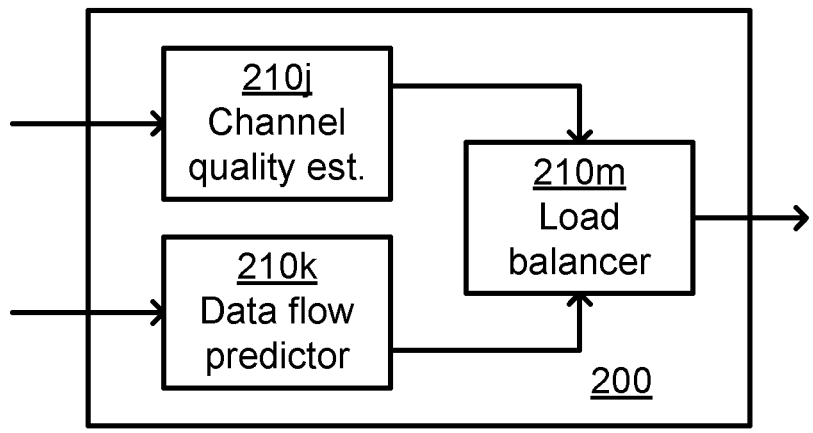
FIG. 2C is a schematic diagram showing blocks of a system according to an embodiment.

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

FIG. 1 is a schematic diagram illustrating a communications network 100 where embodiments presented herein can be applied. The communications network 100 comprises a radio access network node 120 providing network access to wireless devices 110a, 110b within a cell, or coverage region iso. The radio access network node 120 can be a radio base station, a base transceiver station, a node B, an evolved node B, or an access point or any future corresponding node imaginable by the person skilled in the art at this stage, e.g. in view of the 3GPP fifth generation standardization work that is ongoing. Each wireless device 110a, 110b may be a portable wireless device, a mobile station, a mobile phone, a handset, a wireless local loop phone, a user equipment (UE), a mobile equipment, a smartphone, a laptop computer, a tablet computer, a wireless modem, or a sensor device. It may also be a more stationary device such as a telematics unit embedded in or attachable to a vehicle, such as a car, truck, bus, boat, train, airplane and flying drone. The wireless device 110a, 110b may also for example be embedded in or attachable to a domestic appliance, such as in white goods, door locks, surveillance and alarm equipment and autonomous vacuum cleaners and grass cutters. The wireless device may of course also be embedded in or attachable telematics units for robots and 3D printers used for industrial purposes or for domestic support functions. Other examples of where the wireless device may be incorporated or added to is in public service equipment, such as street lamps, surveillance cameras, entrance admittance equipment for public transport. The wireless device may in other words be or be implemented in equipment which is able to utilize the wireless connectivity to the communications network 100. Further examples of such devices are equipment used in healthcare and in payment terminals, e.g. payment terminals for credit cards.

The radio access network node 120 is operatively connected to a core network 160 which is part of the communications network 100, and the core network is in turn operatively connected to a service network 170, such as the Internet, and which is also part of the communications network 100. A wireless device 110a, 110b (not part of the communications network 100) having an operative connection to the radio access network node 120 may thereby exchange data (i.e., receive data packets and send data packets) and access services provided by the service network 170. In order to do so, each wireless device 110a, 110b is allocated resources by the communications network 100. These resources inter alia comprise at least one carrier. In general terms, the cell 150 is associated with a set of carriers, the set of carriers comprising at least two carriers. Load balancing between the carriers in the cell may be performed by moving wireless devices 110a, 110b between the carriers in the set of carriers.

The embodiments disclosed herein relate to load balancing data traffic between at least two carriers in a communications network 100 supporting the at least two carriers. The load balancing is performed by a system 200. In order to obtain the load balancing there is thus provided a system 200, a method performed by the system 200, a computer program product comprising code, for example in the form of a computer program, that when run on a system 200, causes the system 200 to perform the method.

FIG. 2a schematically illustrates, in terms of a number of functional units, the components of the system 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 310 (as in FIG. 3), here in the form of a storage medium 230. The processing circuitry 210 may further be provided as at least one application specific integrated circuit (ASIC), or at least one field programmable gate array (FPGA).

Particularly, the processing circuitry 210 is configured to cause the system 200 to perform a set of operations, or steps, S100-S112. These operations, or steps, S100-S112 will be disclosed below. For example, the storage medium 230 may store the set of operations, and the processing circuitry 210 may be configured to retrieve the set of operations from the storage medium 230 to cause the system 200 to perform the set of operations. The set of operations may be provided as a set of executable instructions.

Thus the processing circuitry 210 is thereby arranged to cause the system 200 to execute methods as herein disclosed. The storage medium 230 may also comprise persistent storage, which, for example, can be any single one or combination of magnetic memory, optical memory, solid state memory or even remotely mounted memory. The system 200 may further comprise a communications interface 220 for communications with at least one radio access node 120, devices and entities of the core network 160, and/or devices and entities of the service network 170. As such the communications interface 220 may comprise one or more transmitters and receivers, comprising analogue and digital components. The processing circuitry 210 controls the general operation of the system 200 e.g. by sending data and control signals to the communications interface 220 and the storage medium 230, by receiving data and reports from the communications interface 220, and by retrieving data and instructions from the storage medium 230. Other components, as well as the related functionality, of the system 200 are omitted in order not to obscure the concepts presented herein.

FIG. 2b schematically illustrates, in terms of a number of functional modules, the components of a system 200 according to an embodiment. The system 200 of FIG. 2b comprises a number of functional modules; an obtain module 210a configured to perform below steps S102, S104, a predict module 210b configured to perform below step S106, and a determine module 210c configured to perform below step S108. The system 200 of FIG. 2b may further comprises a number of optional functional modules, such as any of a classify module 210d configured to perform below step S106a, an update module 210e configured to perform below step S112, a divide module 210f configured to perform below step S110, a machine learn module 210g configured to perform below step S106b, and a provide module 210h configured to perform below step S114. The functionality of each functional module 210a-210h will be further disclosed below in the context of which the functional modules 210a-210h may be used. In general terms, each functional module 210a-210h may in one embodiment be implemented only in hardware or and in another embodiment with the help of software, i.e., the latter embodiment having computer program instructions stored on the storage medium 230 which when run on the processing circuitry makes the system 200 perform the corresponding steps mentioned above in conjunction with FIG. 2b. It should also be mentioned that even though the modules correspond to parts of a computer program, they do not need to be separate modules therein, but the way in which they are implemented in software is dependent on the programming language used. Preferably, one or more or all functional modules 210a-210h may be implemented by the processing circuitry 210, possibly in cooperation with functional units 220 and/or 230. The processing circuitry 210 may thus be configured to from the storage medium 230 fetch instructions as provided by a functional 210a-210h and to execute these instructions, thereby performing any steps as will be disclosed hereinafter.

FIG. 2C schematically illustrates, in terms of a number of blocks 210j-210m, the components of a system 200 according to an embodiment. The system 200 of FIG. 2 comprises a channel quality estimator 210j, a data flow predictor 210k, and a load balancer 210m. The channel quality estimator 210j is configured to obtain the current channel quality of a wireless device of a first carrier and a second carrier. The data flow predictor 210k is configured to classify if a data flow will have a volume of data larger than a specified threshold. The load balancer 210m is configured to determine whether or not to offload the wireless device to the second carrier.

In general terms, each block 210j-210m may in one embodiment be implemented only in hardware or and in another embodiment with the help of software, i.e., the latter embodiment having computer program instructions stored on the storage medium 230 which when run on the processing circuitry makes the system 200 perform the corresponding steps mentioned above in conjunction with FIG. 2c. It should also be mentioned that even though the blocks 210j-210m correspond to parts of a computer program, they do not need to be separate modules therein, but the way in which they are implemented in software is dependent on the programming language used. Preferably, one or more or all block 210j-210m may be implemented by the processing circuitry 210, possibly in cooperation with functional units 220 and/or 230, and/or the functional modules 210a-210h. For example, block 210j may be implemented by functional module 210a, block 210k may be implemented by functional module 210b, and block 210m may be implemented by functional module 210c.

The system 200 may be provided as a standalone device or as a part of at least one further device. For example, the system 200 may be provided in the radio access network node 120 or in a node of the core network 160. Alternatively, functionality of the system 200 may be distributed between at least two devices, or nodes. These at least two nodes, or devices, may either be part of the same network part (such as the radio access network defined by the cell 150 or the core network 160) or may be spread between at least two such network parts. In general terms, instructions that are required to be performed in real time may be performed in a device, or node, operatively closer to the radio access network node 120 than instructions that are not required to be performed in real time. In this respect, at least part of the system 200 may reside in the radio access network, such as in the radio access network node 120.

Thus, a first portion of the instructions performed by the system 200 may be executed in a first device, and a second portion of the of the instructions performed by the system 200 may be executed in a second device; the herein disclosed embodiments are not limited to any particular number of devices on which the instructions performed by the system 200 may be executed.

Hence, the methods according to the herein disclosed embodiments are suitable to be performed by a system 200 residing in a cloud computational environment. Therefore, although a single processing circuitry 210 is illustrated in FIG. 2a the processing circuitry 210 may be distributed among a plurality of devices, or nodes. The same applies to the functional modules 210a-210h of FIG. 2b, the blocks 210h-210k of FIG. 2c, and the computer program 320 of FIG. 3 (see below).

Figure 3:
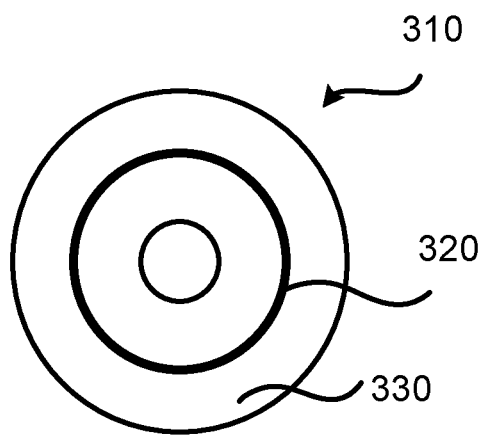
FIG. 3 shows one example of a computer program product comprising computer readable storage medium according to an embodiment.

FIG. 3 shows one example of a computer program product 310 comprising computer readable storage medium 330. On this computer readable storage medium 330, a computer program 320 can be stored, which computer program 320 can cause the processing circuitry 210 and thereto operatively coupled entities and devices, such as the communications interface 220 and the storage medium 230, to execute methods according to embodiments described herein. The computer program 320 and/or computer program product 310 may thus provide means for performing any steps as herein disclosed.

In the example of FIG. 3, the computer program product 310 is illustrated as an optical disc, such as a CD (compact disc) or a DVD (digital versatile disc) or a Blu-Ray disc. The computer program product 310 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 320 is here schematically shown as a track on the depicted optical disk, the computer program 320 can be stored in any way which is suitable for the computer program product 310.

Figure 4:
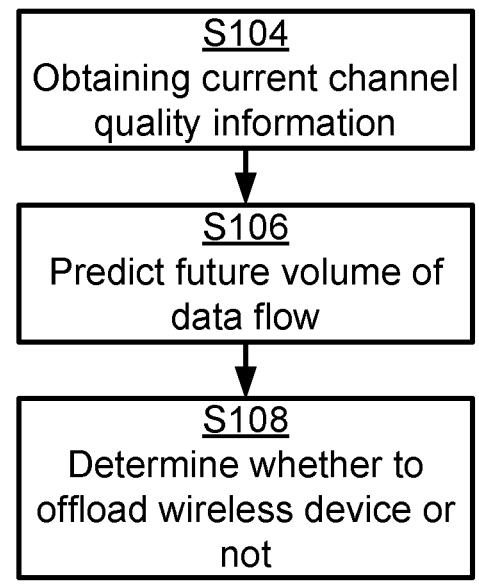
FIGS. 4 and 5 are flowcharts of methods according to embodiments.
Figure 5:
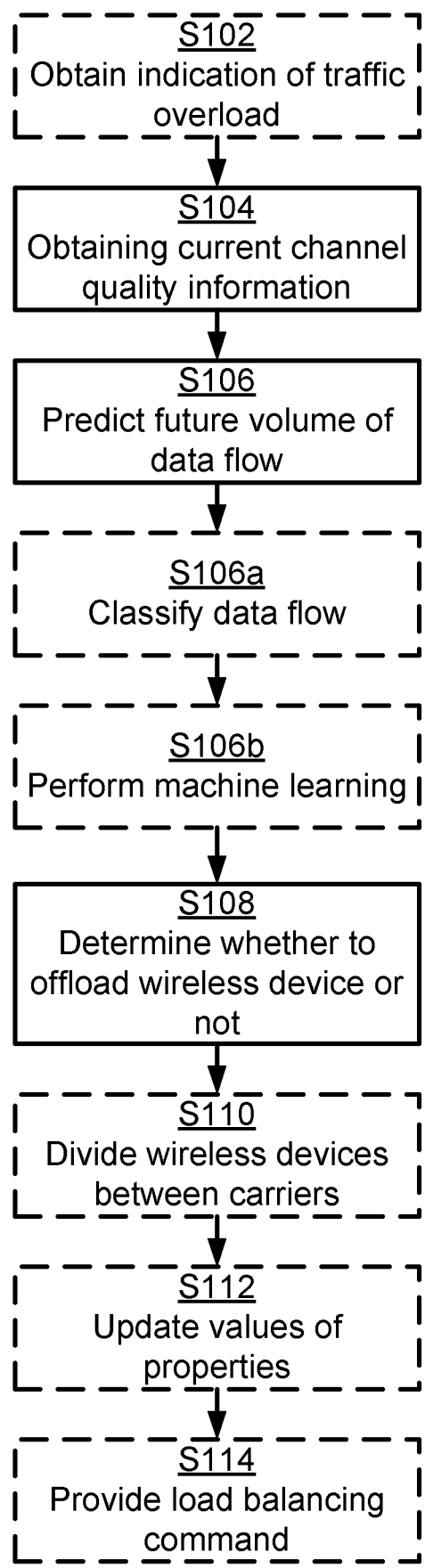

FIGS. 4 and 5 are flow charts illustrating embodiments of methods for load balancing data traffic between at least two carriers in a communications network 100 supporting the least two carriers. The methods are performed by the system 200. The methods are advantageously provided as computer programs 320.

Reference is now made to FIG. 4 illustrating a method for load balancing data traffic between at least two carriers in a communications network 100 supporting the least two carriers as performed by the system 200 according to an embodiment.

The system 200 is configured to, in a step S104, obtain current channel quality information for a wireless device 110a, 110b of the at least two carriers. Examples of channel quality information and how it can be obtained by the wireless device 110a, 110b will be disclosed below. In this respect the obtain module 210a may comprise instructions that when executed by the system 200 causes the processing circuitry 210, possibly in conjunction with the communications interface 220 and the storage medium 230, to obtain the current channel quality information in order for the system 200 to perform step S104.

The system 200 is configured to, in a step S106, predict a future volume of a data flow of the wireless device 110a, 110b. Examples of how to predict the future volume of the data flow of the wireless device 110a, 110b information and how it can be obtained by the wireless device 110a, 110b will be disclosed below. In this respect the predict module 210b may comprise instructions that when executed by the system 200 causes the processing circuitry 210, possibly in conjunction with the communications interface 220 and the storage medium 230, to predict the future volume in order for the system 200 to perform step S106.

The system 200 is configured to, in a step S108, determine whether to offload the wireless device 110a, 110b to a second carrier of the at least two carriers or not according to the current channel quality information and the predicted future volume. Examples of how to determine whether to offload the wireless device 110a, 110b to a second carrier will be disclosed below. In this respect the determine module 210c may comprise instructions that when executed by the system 200 causes the processing circuitry 210, possibly in conjunction with the communications interface 220 and the storage medium 230, to determine whether to offload the wireless device 110a, 110b or not in order for the system 200 to perform step S108.

Embodiments relating to further details of load balancing data traffic between at least two carriers in a communications network 100 supporting the least two carriers will now be disclosed.

A data flow can comprise a sequence of packets received from the wireless device 110a, 110b, or a sequence of packets to be delivered to the wireless device 110a, 110b.

That is, the data flow can comprise a sequence of packets scheduled either to or from the wireless device 110a, 110b.

According to an embodiment all packets in the sequence of packets have an inter-arrival time as in accordance with a radio resource control (RRC) inactivity timer. One example of such an inter-arrival time is 10 seconds.

Reference is now made to FIG. 5 illustrating methods for load balancing data traffic between at least two carriers in a communications network 100 supporting the least two carriers as performed by the system 200 according to further embodiments.

Once the system 200 has determined whether to offload the wireless device 110a, 110b to a second carrier of the at least two carriers or not, as in step S108, the system 200 may be configured to, in a step S114, provide a load balancing command to an entity or device (such as a radio resource manager) responsible for associating the wireless devices 110a, 110b with the carriers. The load balancing command instructs this entity or device to carry out the corresponding load balancing defined by the outcome of step S108.

There can be different factors that trigger the system 200 to perform the load balancing. For example, the procedure of load balancing can be triggered when overload is detected in the communications network 100. Therefore, according to an embodiment the system 200 is configured to, in a step S102, obtain an indication of traffic overload on at least one of the at least two carriers. This indication then acts as a trigger for the system 200 to obtain the current channel quality information (as in step S104), to predict the future volume (as in step S106), and/or to determine whether to offload the wireless device 110a, 110b or not (as in step S108). Hence, when overload is detected in the communications network 100 the system 200 can proceed to performing channel quality estimation and flow volume prediction. The information collected is provided as input to the load balancing procedure where any wireless device 110a, 110b to offload is found.

Channel Quality Estimation

There can be different examples of channel quality information. For example, the current channel quality information for the first carrier of the at least two carriers can be defined by reference signal received power (RSRP) measurements on the first carrier. The current channel quality information for the second carriers of the at least two carriers can be defined by inter-frequency measurements, as performed according to 3GPP TS 36.331 V 12.7.0 "Evolved Universal Terrestrial Radio Access (E-UTRA); Radio Resource Control (RRC); Protocol specification". The inter-frequency measurements can be defined by RSRP measurements on the second carriers. Hence, for a wireless device 110a, 110b respective RSRP values (denoted RSRP1 for the first carrier and RSRP2 for the second carrier) can be obtained. Further, the first carrier may be a primary carrier (such as a primary component carrier), and each at least one second carrier may be a respective secondary carrier (such as a secondary component carrier).

Flow Volume Prediction

As will be further disclosed below, the system 200 can implement machine learning to predict the flow volume of wireless devices 110a, 110b in order to enable handover of wireless devices 110a, 110b in order to have a balanced load of the carriers over time. In general terms, the flow volume prediction comprises two phases; a training phase and a testing phase. The flow volume prediction enables to classify whether a data flow has a data volume larger than a specified threshold or not. The training phase and the testing phase will now be disclosed in turn.

Training Phase

During the training phase the system 200 during an observation time window denoted T_train obtains properties, and values thereof, about wireless devices 110a, 110b as well as the ground truth about the data flow volume of the wireless devices 110a, 110b. Machine learning can be used to find a mapping between the input features (i.e., the properties, and the values thereof, about the wireless devices 110a, 110b) and the ground truth. Such a mapping is commonly referred to as a model. In general terms, the term "ground truth" here refers to the actual value of what is to be predicted. As used herein, the ground truth takes a binary value that is equal to 1 if the flow volume is over the threshold and o otherwise. The accuracy can then be calculated by determining the difference between the prediction and the ground truth. The ground truth may be determined after observing an inter-arrival time larger than the RRC inactivity timer. In relation thereto, the term "ground truthing" may be used to denote the process of obtaining the proper objective (provable) data (i.e., the properties, and the values thereof, about the wireless devices 110a, 110b) used for proving or disproving the classification hypothesis.

The properties obtained may be the number of packets in the data flow, the total size of all packets in the data flow, the packet inter-arrival time for packets in the data flow, the time since last packet for packets in the data flow, the packet bearer information of packets in the data flow, or any combination thereof. The number of packets may be the number of packets sent by the wireless devices 110a, 110b, the number of packets that have been sent to the wireless devices 110a, 110b, or the total number of packets sent to and from the wireless devices 110a, 110b. The total size of all packets in the data flow may be for all packets sent by the wireless devices 110a, 110b, for all packets that have been sent to the wireless devices 110a, 110b, or for all packets sent to and from the wireless devices 110a, 110b, either in terms of actual size (in bytes) or in relative terms (such as 25, 50, 75% percentiles) with respect to a predefined packet size. The packet inter-arrival time for packets in the data flow may be given in terms of the average packet inter-arrival time, the standard deviation (or variance) of the packet inter-arrival time, the minimum packet inter-arrival time, the maximum packet inter-arrival time, or in relative terms (such as 25, 50, 75% percentiles) with respect to a predefined packet inter-arrival time. The packet bearer information of packets in the data flow may represent the percentage of packets on each bearer, including default, Voice over Long Term Evolution (VoLTE), etc.

The system 200 may further be configured to, in a step S106a, classify the data flow of the wireless device into one of at least two data flow classes in order to predict the future volume of a data flow of the wireless device 110a, 110b. Each such data flow class is associated with its own data flow volume interval. Each data flow volume interval may be fixed. For example, a list of thresholds, denoted T_list, to separate the data flow classes could be T_list=[100 kB, 1 MB, 10 MB]. Also other values of thresholds could be used. A series of classification hypotheses, one for each possible threshold in the threshold list T_list, may thus be tested. The classification can thus be used to indicate if a data flow has a volume of data larger than a specified threshold, where the specified threshold takes a value in the T_list.

According to an embodiment the system 200 is configured to, in a step S106b, perform machine learning on the set of traffic flow properties and values thereof for a plurality of wireless devices 110a, 110b and associated observed data flows of the wireless devices 110a, 110b in order to determine the at least two data flow classes. Examples of machine learning algorithms to use during the training phase include, but are not limited to, random forest (e.g., with 50 trees), logistic regression, neural networks, support vector machines (SVM), and gradient boosting.

The training phase can be repeated to make sure that the data flow classes used still reflect the data flow in the communications network 100. Particularly, according to an embodiment the system 200 is configured to, in a step S112, update the data flow class in accordance with which data flow class the data flow is classified into. In this way the data flow classes can be continuously updated.

Testing Phase

Once having performed the training phase, the offload decision may be taken in view of the determined data flow classes. That is, whether to offload the wireless device 110a, 110b to the second carrier or not can be determined also according to the data flow class in which the data flow has been classified.

As an example, when overload is detected the system 200 during a time period T_observation observes the data flow of the wireless device 110a, 110b and obtains current channel quality information for the wireless device 110a, 110b as in step S104. The system 200 then predicts the future volume of the data flow of the wireless device 110a, 100b as in step S106 for each possible threshold in the threshold list T_list. For example, values of properties for the data flow may be associated with one of the at least two data flow classes, and wherein the data flow of the wireless device is classified into one of at least two data flow classes of step S106a according to the values of properties.

According to an illustrative example the output of this phase has the form according to Table 1, where WD-k represents wireless device k out of a total of N wireless devices.

TABLE 1

|         | WD-1 | WD-2 | ... | WD-k | ... | WD-N |
|---------|------|------|-----|------|-----|------|
| 100 kB  | 1    | 1    |     | 0.45 |     | 0    |
| 1 MB    | 1    | 0    |     | 0.25 |     | 0    |
| 10 MB   | 0    | 0    |     | 0.20 |     | 0    |

For the illustrative example it can from Table 1 be deduced that for the considered data flow classes (smaller than 100 kB, between 100 kB and 1 MB, and larger than 10 MB), WD-1 belongs to the class defined by the second threshold value (1 MB), WD-2 belongs to the class defined by the first threshold value (100 kB), and WD-k with probability 0.45 belongs to the class defined by the first threshold value, with probability 0.25 belongs to the class defined by the second threshold value, and with probability 0.20 belongs to the class defined by the third threshold value (10 MB). WD-N currently has no data flow and is therefore considered inactive and thus not classified into any class.

The most probable of the different data flow classes is passed on to the load balancing phase for each wireless device 110a, 110b. Hence, where the data flow initially is classified into at least two of the at least two data flow classes according to a probability measure, the most probable one of these at least two of the at least two data flow classes is selected as final classification of the data flow. That is, for WD-k the most probable data flow class is the class defined by the first threshold value.

Figure 6:
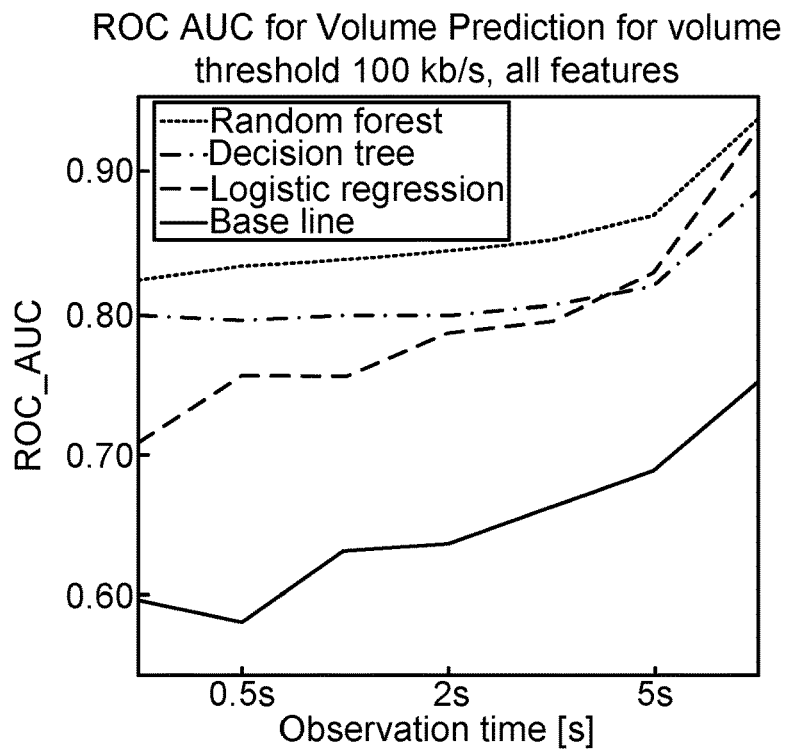
FIGS. 6 and 7 schematically illustrate simulation results according to embodiments.

FIG. 6 shows the prediction accuracy (in terms of receiver operating characteristics area under curve in percentage as a function of observation time in seconds) for different machine learning algorithms for predicting if a data flow will be larger than 100 kB using a real set of data flows as input. Machine learning based on random forest achieves a high accuracy with a short observation time under 1 second and a very high accuracy with 5 seconds.

Load Balancing

Two embodiments for load balancing will now be disclosed in turn.

A first embodiment for load balancing involves, for each data flow class, dispatching the same number of wireless devices 110a, 110b to each of the at least two carriers. Hence, according to an embodiment the system 200 is configured to, in a step S110, divide the wireless devices in each data flow class between the at least two carriers according to the current channel quality information for the wireless devices. For example, if there are two carriers and N1 number of wireless devices belonging to the class defined by a certain value of T_list, then half of these wireless devices (i.e., N½ wireless devices) are handed over to the second carrier. Exactly which wireless devices to be handed over is based on channel quality measurements.

If the number N1 of wireless devices in a data flow class is an odd number, then only (N1−1)/2 wireless devices need to be handed over to the second carrier. The wireless devices in each data flow class may thereby be divided as equally as possible between the at least two carriers.

The system 200 may then be configured to remember that an unequal number of wireless devices has been handed over and hand over (N1+1)/2 wireless devices for the next data flow class, thereby achieving a more fine-grained load balancing. That is, wherein a case the wireless devices in one of the data flow classes are not exactly equally divided between the at least two carriers, the wireless devices in another one of the data flow classes are divided between the at least two carriers so as to equalize number of wireless devices between the at least two carriers.

As noted above, exactly which wireless devices to be handed over are based on channel quality. Hence, which wireless devices in each data flow class to be offloaded to which one of the at least two carriers is determined according to the current channel quality information for the wireless devices. The wireless devices 110a, 110b from each data flow class may therefore be ranked according to the difference between RSRP1 and RSRP2 (see above for definition of RSRP1 and RSRP2). One illustrative example thereof is provided in Table 2.

TABLE 2

| | WD | | | | | | |
|---|---|---|---|---|---|---|---|
| | 7 | 4 | 18 | 1 | ... | ... | 2 |
| RSRP1-RSRP2 | 40 | 32 | 17 | −4 | ... | ... | −17 |

If there are N2 number of wireless devices in data flow class i, the first N2/2 wireless devices according to this ranking stay with the first carrier and the rest of the wireless devices in data flow class i are handed over to the second carrier. This is repeated for each data flow class. This procedure can be generalized for any number of carriers.

This embodiment is very efficient when the interference on the carriers is low to medium, but when the interference is comparatively high, then all data flows tend to take long to be transmitted and equal balancing of the data flows may result in comparatively good RSRP for some wireless devices being wasted.

A second embodiment for load balancing is based on equal flow length balancing with an adaptive signal to noise ratio (SNR) gap. The second embodiment can be used to mitigate the unbalance due to the interference being comparatively high.

As an illustrative example, assume that values of RSRP1-RSRP2 for one data flow class are given as in Table 3.

TABLE 3

| | WD | | | | | | |
|---|---|---|---|---|---|---|---|
| | 7 | 4 | 18 | 1 | 32 | 9 | 2 |
| RSRP1-RSRP2 | 40 | 32 | 17 | 15 | 13 | −4 | −17 |

The first embodiment for load balancing would provide the load balancing between the first carrier (Allocation: 1) and the second carrier (Allocation: 2) according to Table 4.

TABLE 4

| | WD | | | | | | |
|---|---|---|---|---|---|---|---|
| | 7 | 4 | 18 | 1 | 32 | 9 | 2 |
| RSRP1-RSRP2 | 40 | 32 | 17 | 15 | 13 | −4 | −17 |
| Carrier Allocation | 1 | 1 | 1 | 1 | 2 | 2 | 2 |

According to this illustrative example, wireless device number 32 has a much better RSRP on the first carrier but is still allocated to the second carrier in order to have the same number of wireless devices from each data flow class on each of the two carriers. Hence the load balancing comes to a large cost.

The second embodiment is therefore based on balancing each data flow class between the carriers also based on a channel quality imbalance factor, SNR gap (Gsnr). Thereby, if the channel quality for a wireless device is much better on one specific carrier than on the rest of the carriers, then a slight imbalance toward this carrier can be allowed. This imbalance is controlled through the parameter Gsnr. How to determine the value of Gsnr depends on the interference level. If the interference level is considered comparatively low, Gsnr can be close, or even equal, to o; if the interference level is considered comparatively high, Gsnr can be in the order of 30 dBm.

Using the parameter Gsnr, a wireless device can only be associated with a carrier for which the difference in RSRP is larger than Gsnr. That is, which wireless devices in each data flow class to be offloaded to which one of the at least two carriers can further determined according to a difference between a values of the channel quality information for the wireless device on one of the at least two carriers and another one of the at least two carriers.

For the previous example, with Gsnr=10 dBm, the allocation to carriers according to Table 5 are obtained according to the second embodiment for load balancing.

TABLE 5

| | WD | | | | | | |
|---|---|---|---|---|---|---|---|
| | 7 | 4 | 18 | 1 | 32 | 9 | 2 |
| RSRP1-RSRP2 | 40 | 32 | 17 | 15 | 13 | −4 | −17 |
| Carrier Allocation | 1 | 1 | 1 | 1 | 1 | 2 | 2 |

Figure 7:
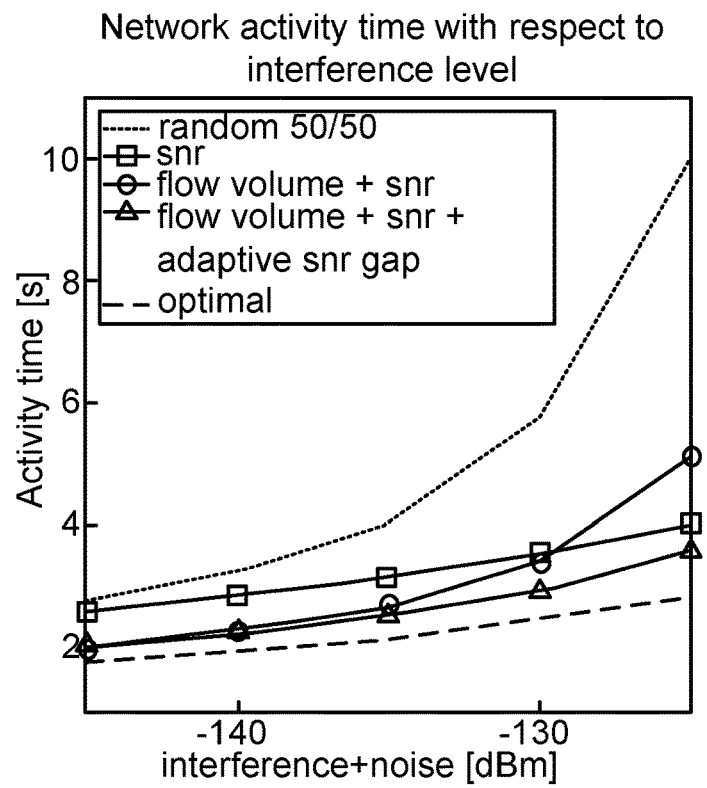

FIG. 7 compares results of different ways to perform load balancing to the optimal performance theoretically achievable calculated using brute force. The curves in FIG. 7 represent a random load balancing, putting 50% of the wireless devices on each carrier (random 50/50), load balancing only based on SNR (snr), load balancing based on the herein disclosed first embodiment for load balancing (flow volume+snr), and load balancing based on the herein disclosed second embodiment for load balancing (flow volume+snr+adaptive snr gap). At low interference level, the activity time is much lower for the first embodiment compared to pure SNR based load balancing. The results of the second embodiment are equal to the result of the first embodiment for low interference but are much better for high interference.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A system for load balancing data traffic between at least two carriers in a communications network supporting the at least two carriers, the system comprising processing circuitry, the processing circuitry being configured to cause the system to:
   perform machine learning on a set of traffic flow properties and values thereof for a plurality of wireless devices and associated observed data flows of the wireless devices in order to determine at least two data flow classes;
   obtain current channel quality information for a wireless device of the at least two carriers, wherein the current channel quality information for the at least two carriers is a reference signal received power measurement on each of the at least two carriers;
   predict a future volume of a data flow of the wireless device, wherein the prediction involves classification of the data flow of the wireless device into one of the at least two data flow classes based on the observed data flows of the wireless device;
   determine whether to offload the wireless device to a second carrier of the at least two carriers or not, according to the current channel quality information and the predicted future volume according to the data flow class in which the data flow has been classified;
   divide the wireless devices in each data flow class between the at least two carriers based on a determination to offload the wireless device to a second carrier of the at least two carriers according to the current channel quality information and the predicted future volume, wherein the wireless devices in each data flow class are divided to balance the number of the wireless devices in each data flow class between the at least two carriers,
   in response to determining that the wireless devices in one of the data flow classes cannot be divided to balance the number of wireless devices between the at least two carriers in the one of the data flow classes, divide the wireless devices in another one of the data flow classes between the at least two carriers, and
   wherein the data flow comprises a sequence of packets scheduled either to or from the wireless device.

2. The system according to claim 1, wherein the processing circuitry is further configured to control selective offloading of the wireless device to the second carrier of the at least two carriers responsive to the determination.

3. The system according to claim 2, wherein each data flow volume interval is fixed.

4. The system according to claim 1, wherein each data flow class has a different data flow volume interval.

5. The system according to claim 1, wherein values of properties for the data flow is associated with one of the at least two data flow classes, and wherein the data flow of the wireless device is classified into one of at least two data flow classes according to the values of properties.

6. The system according to claim 5, wherein the properties comprise at least one of packet inter-arrival time for packets in the data flow and time since last packet for packets in the data flow.

7. The system according to claim 1, wherein the processing circuitry is configured to cause the system to:
   update the data flow class in accordance with which data flow class the data flow is classified into.

8. The system according to claim 1, wherein the data flow initially is classified into at least two of the at least two data flow classes according to a probability measure, and wherein the most probable one of these at least two of the at least two data flow classes is selected as final classification of the data flow.

9. The system according to claim 1, wherein the dividing the wireless devices in another one of the data flow classes between the at least two carriers comprises to equalize the number of wireless devices in the another one of the data flow classes between the at least two carriers.

10. The system according to claim 1, where there are at least two second carriers of the at least two carriers, and wherein the current channel quality information for the at least two second carriers is defined by inter-frequency measurements.

11. The system according to claim 10, wherein the inter-frequency measurements are defined by reference signal received power measurements on the at least two second carriers of the at least two carriers.

12. The system according to claim 1, wherein all packets in the sequence of packets have an inter-arrival time as in accordance with a radio resource control inactivity timer.

13. The system according to claim 1, wherein the processing circuitry is configured to cause the system to:
   obtain an indication of traffic overload on at least one of the at least two carriers; and
   wherein the indication acts as trigger for obtaining the current channel quality information, for predicting the future volume, and/or for determining whether to offload the wireless device or not.

14. The system according to claim 1, wherein the processing circuitry is configured to cause the system to:
   provide a load balancing command corresponding to a result from determining whether to offload the wireless device to the second carrier of the at least two carriers or not.

15. A radio access network node comprising a system according to claim 1.

16. A method for load balancing data traffic between at least two carriers in a communications network supporting the at least two carriers, the method being performed by a system, comprising:

performing machine learning on a set of traffic flow properties and values thereof for a plurality of wireless devices and associated observed data flows of the wireless devices in order to determine at least two data flow classes;

obtaining current channel quality information for a wireless device of the at least two carriers, wherein the current channel quality information for the at least two carriers is a reference signal received power measurement on each of the at least two carriers;

predicting a future volume of a data flow of the wireless device, wherein the prediction involves classification of the data flow of the wireless device into one of the at least two data flow classes based on the observed data flows of the wireless device;

determining whether to offload the wireless device to a second carrier of the at least two carriers or not according to the current channel quality information and the predicted future volume according to the data flow class in which the data flow has been classified;

dividing the wireless devices in each data flow class between the at least two carriers based on a determination to offload the wireless device to a second carrier of the at least two carriers according to the current channel quality information and the predicted future volume, wherein the wireless devices in each data flow class are divided to balance the number of the wireless devices in each data flow class between the at least two carriers, in response to determining that the wireless devices in one of the data flow classes cannot be divided to balance the number of wireless devices between the at least two carriers in the one of the data flow classes, dividing the wireless devices in another one of the data flow classes between the at least two carriers, and wherein the data flow comprises a sequence of packets scheduled either to or from the wireless device.

17. The method according to claim 16, wherein the dividing the wireless devices in another one of the data flow classes between the at least two carriers comprises to equalize the number of wireless devices in the another one of the data flow classes between the at least two carriers.

18. A computer program product that balances data traffic between at least two carriers in a communications network supporting the at least two carriers, the computer program product comprising a computer program and a non-transitory computer readable storage medium on which the computer program is stored, the computer program comprising computer code which, when run on processing circuitry of a system, causes the system to:

perform machine learning on a set of traffic flow properties and values thereof for a plurality of wireless devices and associated observed data flows of the wireless devices in order to determine at least two data flow classes;

obtain current channel quality information for a wireless device of the at least two carriers, wherein the current channel quality information for the at least two carriers is a reference signal received power measurement on each of the at least two carriers;

predict a future volume of a data flow of the wireless device, wherein the prediction involves classification of the data flow of the wireless device into one of the at least two data flow classes based on the observed data flows of the wireless device;

determine whether to offload the wireless device to a second carrier of the at least two carriers or not according to the current channel quality information and the predicted future volume according to the data flow class in which the data flow has been classified; and divide the wireless devices in each data flow class between the at least two carriers based on a determination to offload the wireless device to a second carrier of the at least two carriers according to the current channel quality information and the predicted future volume, wherein the wireless devices in each data flow class are divided to balance the number of the wireless devices in each data flow class between the at least two carriers, in response to determining that the wireless devices in one of the data flow classes cannot be divided to balance the number of wireless devices between the at least two carriers in the one of the data flow classes, divide the wireless devices in another one of the data flow classes between the at least two carriers, and wherein the data flow comprises a sequence of packets scheduled either to or from the wireless device.

19. The computer program product according to claim 18, wherein the dividing the wireless devices in another one of the data flow classes between the at least two carriers comprises to equalize the number of wireless devices in the another one of the data flow classes between the at least two carriers.

* * * * *